(12) United States Patent
Banga et al.

(10) Patent No.: US 12,064,803 B2
(45) Date of Patent: *Aug. 20, 2024

(54) SYSTEMS AND METHODS TO FACILITATE HOSE AND FITTING IDENTIFICATION AND ASSEMBLY

(71) Applicant: ContiTech USA, Inc., Fairlawn, OH (US)

(72) Inventors: Cameron Banga, Valparaiso, IN (US); Jaroslaw Zakrzewski, Wadsworth, OH (US); William Lambert, Brooklyn, NY (US)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,399

(22) Filed: Nov. 2, 2023

(65) Prior Publication Data
US 2024/0066583 A1 Feb. 29, 2024

Related U.S. Application Data

(63) Continuation of application No. 16/934,736, filed on Jul. 21, 2020, now Pat. No. 11,833,568.

(51) Int. Cl.
*B21D 39/04* (2006.01)
*H04B 5/77* (2024.01)

(52) U.S. Cl.
CPC .......... *B21D 39/048* (2013.01); *B21D 39/046* (2013.01); *H04B 5/77* (2024.01)

(58) Field of Classification Search
CPC .. B21D 39/046; B21D 39/048; G06Q 10/087; G06Q 10/20; H04B 5/77
See application file for complete search history.

(56) References Cited

U.S. PATENT DOCUMENTS

| 4,550,587 | A | 11/1985 | Eisenzimmer |
| 4,854,031 | A | 8/1989 | Eisenzimmer |
| 10,618,151 | B2 | 4/2020 | Kanack et al. |

(Continued)

FOREIGN PATENT DOCUMENTS

WO 2016164522 A1 10/2016

OTHER PUBLICATIONS

International Search Report dated Oct. 22, 2021 of International Application PCT/US2021/070909 on which this application is based.

*Primary Examiner* — Omer S Khan
(74) *Attorney, Agent, or Firm* — Gregory J. Adams; Richard A. Wolf (57) ABSTRACT

A crimper analyzer system is disclosed. The crimper analyzer system also includes a network interface. The crimper analyzer system also includes a memory storage. The crimper analyzer system also includes one or more processors configured to: receive hose specifications and fitting specifications from the network interface, generate crimp parameters based on the received hose specifications and crimp operation data, obtain additional crimp operation data for a hose assembly operation, update the crimp operation data with the additional crimp operation data and store in the updated crimp operation data in the memory storage, and generate a unique assembly identification (UAID) for the hose assembly operation subsequent to the hose assembly operation.

16 Claims, 4 Drawing Sheets

(56) References Cited

U.S. PATENT DOCUMENTS

| | | | |
|---|---|---|---|
| 2005/0199700 A1* | 9/2005 | Baker | G06Q 10/06 257/679 |
| 2009/0248324 A1* | 10/2009 | Hamilton | G01M 3/2846 73/40 |
| 2010/0174495 A1* | 7/2010 | Pereira | G01M 5/0033 702/34 |
| 2013/0131855 A1* | 5/2013 | Intagliata | B21D 39/048 700/117 |
| 2013/0160284 A1* | 6/2013 | Gatz | B21D 39/048 29/715 |
| 2020/0114413 A1 | 4/2020 | Thompson et al. | |
| 2020/0250358 A1* | 8/2020 | McGrath | G06Q 50/04 |

* cited by examiner

SYSTEMS AND METHODS TO FACILITATE HOSE AND FITTING IDENTIFICATION AND ASSEMBLY

CROSS REFERENCE TO RELATED APPLICATIONS

This Patent Applications is a Continuation Applications of, and claims priority to, U.S. Nonprovisional patent application Ser. No. 16/934,736 filed Jul. 21, 2020, which is a national stage entry of International Application No. PCT/US2021/070909, filed on Jul. 20, 2021.

FIELD

The disclosure generally relates to systems and methods for hose assembly and identification.

BACKGROUND

Hoses are commonly used to transport hydraulic fluid, fluid, gas, solid and air from one location to another. These hoses can connect to tanks, tankers, other hoses, platforms and the like to transport fluid and/or air.

To connect hoses, suitable fittings are attached to these hoses. Then, the fittings connect to the tanks, tankers, other hoses, platforms and the like. Various methods are used to attach hose fittings to hoses.

What is needed are techniques to facilitate fitting attachment and use of hose crimping machines.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Hoses are commonly used to transport fluid and air from one location to another. These hoses can connect to tanks, tankers, other hoses, platforms and the like to transport fluid and/or air.

To connect hoses, suitable fittings are attached to these hoses. Then, the fittings connect to the tanks, tankers, other hoses, platforms and the like. Various methods are used to attach hose fittings to hoses. Generally, these methods involve looking in a reference book for a crimping pressure and then crimping a fitting to the hose using the referenced crimping pressure.

There are some systems that print labels that detail, for example, a hydraulic hose assembly, including the hose and fittings. These labels merely stick on the hose and may include date of assembly and/or manufacturer.

What is needed are techniques to facilitate hose and fitting assembly and identification.

One or more embodiments include a system to create a unique identification of a hose assembly at a time of creation based on hose information and crimp process related measurements. The unique identification, and related information can be utilized for assembly history tracking, inventory management, modification or improving crimp parameters used for the hose assembly.

Figure 1:
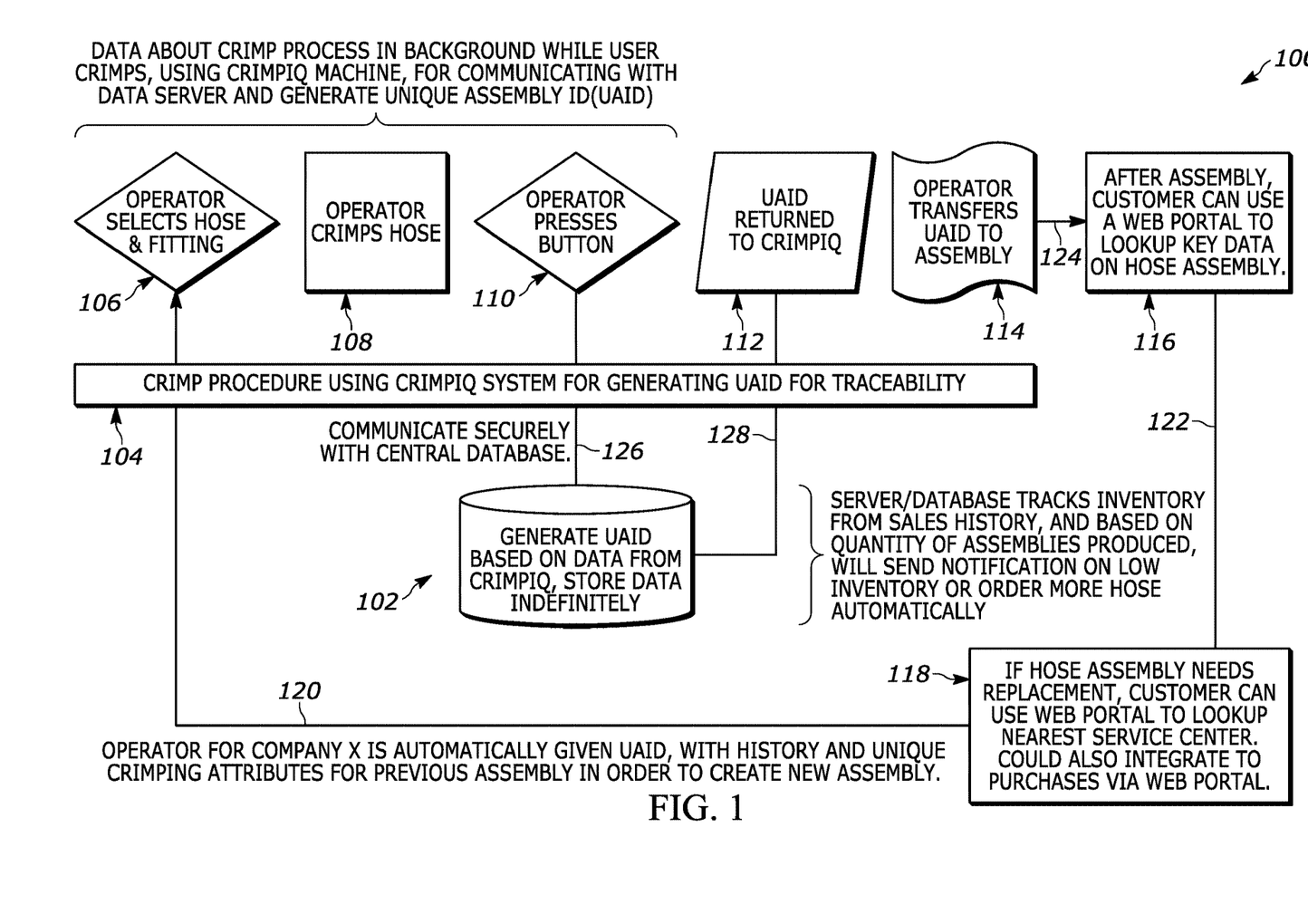
FIG. 1 is a diagram illustrating a method 100 for hose assembly and identification in accordance with one or more embodiments.

FIG. 1 is a diagram illustrating a method 100 for hose assembly and identification in accordance with one or more embodiments. It is appreciated that the method 100 is provided for illustrative purposes and that suitable variations are contemplated.

Figure 2:
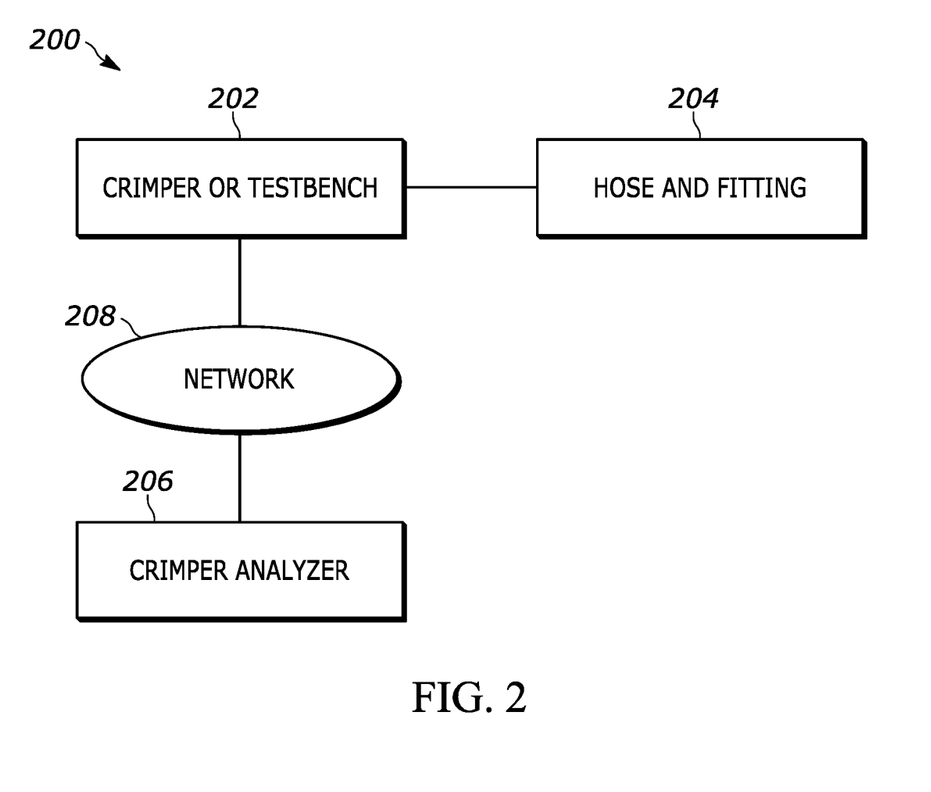
FIG. 2 is a diagram illustrating a system 200 for assembling a hose and fitting in accordance with one or more embodiments.

The method 100 operates using a hose assembly system 200, which includes a crimper or testbench 202 and an analyzer 206 and utilizes a network 208 to assemble a hose and fitting 204 as shown in FIG. 2.

An example of suitable operation of the system 200 is shown in FIG. 1 by the method 100. An order and flow are shown in FIG. 1 for illustrative purposes, however it is appreciated that the method 100 can operate with suitable variations.

A unique assembly identification (UAID) is generated at 102. The UAID is generated based on data/information from the crimper or crimp controller 202. The crimper 202 stores the data in a server or central database. The data include crimping parameters, such as pressure, central position and the like.

In one example, the crimper or crimp controller 202 is a CrimpIQ controller by Continental. The CrimpIQ controller is a controller for distributors and customers in the hydraulic and industrial hose markets. The CrimpIQ controller enables instantaneous updates to the crimper thereby reducing costly downtime and offering a new level of enhanced efficiency, safety, quality and speed to our customers operations. Crimpers equipped with CrimpIQ controllers can provide instantaneous maintenance information and updates for users who crimp hydraulic and industrial hose.

The CrimpIQ controller designed to provide remote maintenance and updates, uses Cloud-based technology, and is for crimping hydraulic and industrial hose assemblies. The monitoring process can be entirely cloud-based.

A crimping procedure is designed at 104 using the crimping parameters. The crimper 202 can performing the crimping procedure to attach the hose and fitting 204. The crimper 202 can communicate with a central database using 126. Additionally, the server (analyzer 206) can track inventory at 128 from sales history and, based on quantity of assemblies produced, will send notification on low inventory and/or order additional hoses automatically.

An operator selects the hose and fitting 204 for assembly at 106.

The operator crimps the hose and fitting 204 together as an assembly at 108 using the crimper 202.

The operator presses a button at 110.

In response to the event at 110, the UAID is generated and returned at 112.

The operator transfers the UAID to the hose and fitting 204 at 114, which is now assembled. In one example, the UAID is encoded in an RFID tag and attached to the hose. In another example, the UAID is printed on a label and attached to the hose.

A customer can use the UAID as a reference to lookup data on the hose assembly at 116.

The analyzer 206 is configured to track usage of the hose 204 at 118. The analyzer 206 is also configured to determine if the hose needs replacement and/or serviced. Further, the analyzer 206 is configured to contact and/or identify a suitable service center.

It is appreciated that suitable variations of the method 100 are contemplated, including additional blocks and/or omission of shown blocks.

FIG. 2 is a diagram illustrating a system 200 for assembling a hose and fitting in accordance with one or more embodiments. The system 200 is provided for illustrative purposes and it is appreciated that suitable variations of the system 200 are contemplated.

The system 200 includes a crimper or testbench 202, a hose 204, a crimper analyzer 206 and a network 208. The system 200 can be utilized to perform the method 100, described above.

The crimper 202 is generally configured to perform hose assembly by crimping the hose 204 to a selected fitting. The crimper 202 can be configured by an operator and can receive or input hose specifications and fitting specifications. The crimper 202 receives crimp parameters from the analyzer 206 and uses the received crimp parameters to perform the hose assembly. The crimper 202 monitors and measures the crimping process and provides measured data to the analyzer for the hose assembly. Post crimping, the crimper 202 tags the hose 204 with a unique assembly identification (UAID).

The crimp parameters can include diameters, die sizes, die types, force, duration and the like.

A testbench 210 can be used instead of or in addition to the crimper 202. The testbench can be used to perform hose assembly. Additionally, the testbench 210 can additionally perform testing operation on the hose 204. For example, the testbench 210 can be configured to perform a high pressure test at a multiple of an operating pressure for the hose to test for leaking, rupture of the hose, and the like. The testbench provides the test results to the analyzer 206.

The crimper analyzer 206 is configured to generate the crimp parameters based on the hose specifications and the fitting specifications and operational data. The operational data can include measurements from prior hose assembly operations, force used, crimp duration, pressure tests, test results from the testbench 210 and the like. The crimper analyzer 206 is configured to update the operational data with the provided measured data from the crimper and the test results from the testbench 210.

Additionally, the crimper analyzer 206 is configured to generate the UAID for the hose 204.

The crimper analyzer 206 is also configured to track usage information for the hose. This usage information can include geographic location, environmental conditions and the like.

Further, the crimper analyzer 206 is configured to determine potential failures and maintenance for the hose 204.

Figure 3:
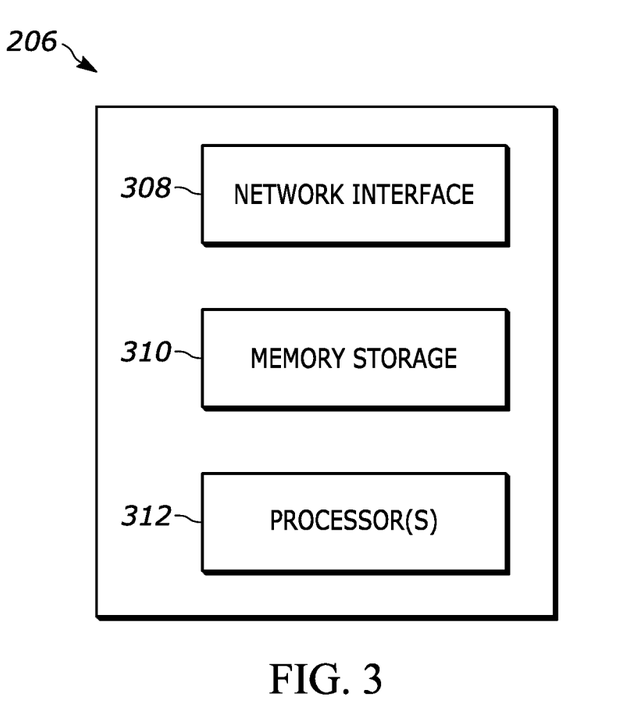
FIG. 3 is a diagram illustrating a crimper analyzer 206 in accordance with one or more embodiments.

FIG. 3 is a diagram illustrating a crimper analyzer 206 in accordance with one or more embodiments. The analyzer 206 is depicted for illustrative purposes and it is appreciated that other elements/components are contemplated.

The analyzer 206 is shown with a network interface 308, a memory storage 310 and one or more processors 312.

The network interface 308 is an interface to a transmitter/receiver/transceiver and can be coupled to a network, such as a cloud network, 5G, 3G, the Internet, and the like.

The network interface 308 is configured to receive hose specifications and fitting specifications from the network.

The memory 310 can be a volatile and/or non-volatile memory.

The one or more processors 312 are configured to receive the hose specifications and fitting specifications from the network interface; generate crimp parameters based on the received hose specifications, the fitting specifications and/or crimp operation data; update the crimp operation data with additional crimp operation data; store the updated crimp operation data in the memory storage; and generate a unique assembly identification (UAID) for the hose assembly operation subsequent to the hose assembly operation.

Figure 4:
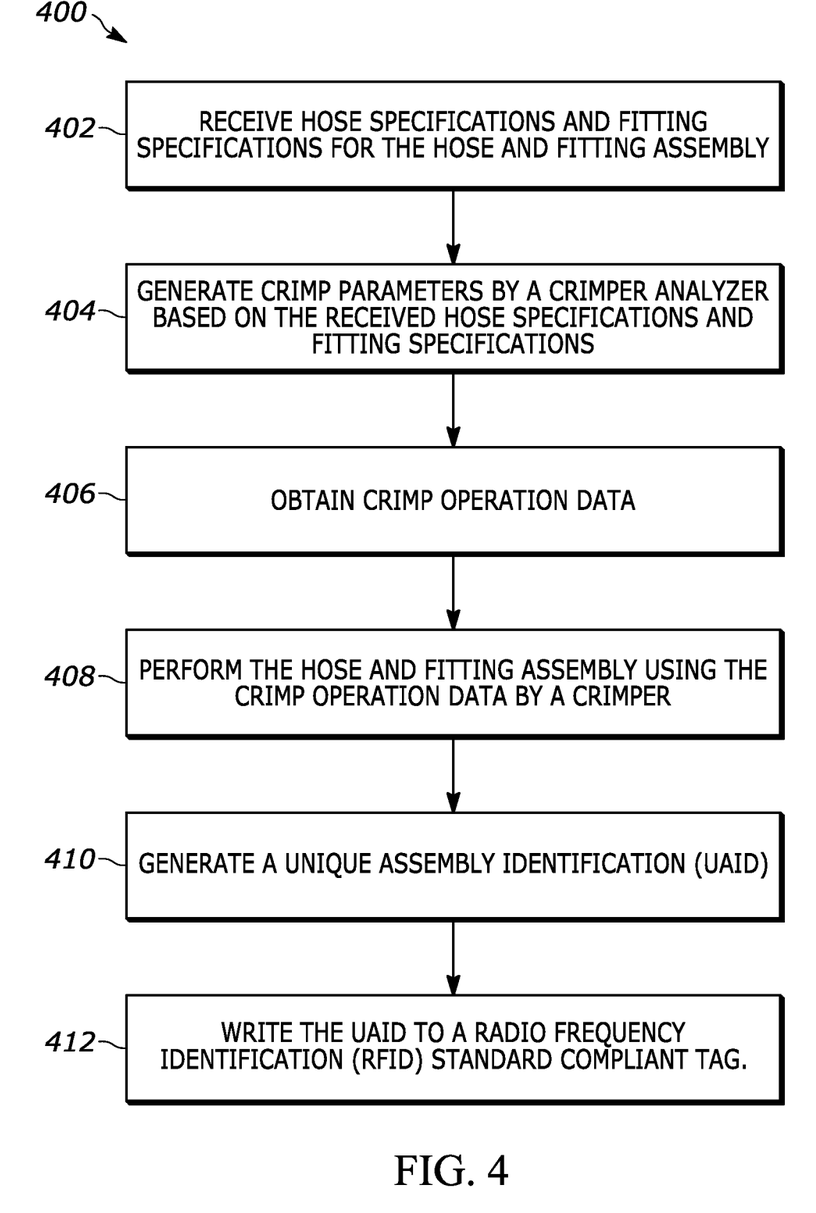
FIG. 4 is a flow diagram illustrating a method 400 of performing hose and fitting assembly in accordance with one or more embodiments.

FIG. 4 is a flow diagram illustrating a method 400 of performing hose and fitting assembly in accordance with one or more embodiments. It is appreciated that the method 400 can be performed in any suitable order and that additional elements can be included and/or shown elements omitted.

Hose specifications and fitting specifications for the hose and fitting assembly are received at 402 by a crimper analyzer.

The crimper analyzer generates crimp parameters based on the received hose specifications and fitting specifications at 404.

Crimp operation data is obtained by the analyzer from a crimper or testbench at 406.

The crimper or testbench performs the hose and fitting assembly using the crimp operation data from the crimper analyzer at 408.

The crimper or analyzer generates a unique assembly identification (LAID) at 410.

The UAID is written to a radio frequency identification (RFID) standard compliant tag or techniques using automatic identification and data capture (AIDC) at 412.

In one variation of the method, the crimp parameters include a crimping force and the crimp operation data includes force applied during crimping and duration of crimping.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). The techniques can also be used with new radio (NR) 5G, also from the 3GPP organization. Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is appreciated that the various aspects/embodiments can utilize short-range communication, such as near field communication (NFC). The NFC standard related to the radio-frequency identification (RFID) standard describes a communication protocol for transmitting information between two devices.

An RFID tag can be used, which includes a radio transponder; a radio receiver and transmitter. When triggered by an electromagnetic interrogation pulse from a nearby RFID reader device, the RFID tag transmits digital data, such as an identifying number, back to the reader. Passive RFID tags are powered by energy from the RFID reader's interrogating radio waves. Active RFID tags are powered by a battery and thus can be read at a greater range from the RFID reader; up to hundreds of meters. Unlike a barcode, the tag doesn't need to be within the line of sight of the reader, so it may be embedded in the tracked object. RFID is one method of automatic identification and data capture (AIDC). It is appreciated that the various aspects/embodiments can utilize RFID tags and/or other techniques of AIDC.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

One general aspect includes a crimper analyzer system. The crimper analyzer system also includes a network interface. The crimper analyzer system also includes a memory storage. The crimper analyzer system also includes one or more processors configured to: receive hose specifications and fitting specifications from the network interface, generate crimp parameters based on the received hose specifications and crimp operation data, obtain additional crimp operation data for a hose assembly operation, update the crimp operation data with the additional crimp operation data and store in the updated crimp operation data in the memory storage, and generate a unique assembly identification (UAID) for the hose assembly operation subsequent to the hose assembly operation.

Implementations may include one or more of the following features. The system where the hose specifications include hose material, inner diameter, and outer diameter. The fitting specifications include fitting material and fitting outer diameter. The crimp parameters include crimp diameter, pressure data for crimp head, crimp head for position, physical hose properties, temperature, and pressure. The one or more processors are configured to provide the UAID to the network interface for transmission to a crimper. The operational data includes crimp start time, crimp end time, crimp pressure, and one or more error codes. The one or more processors are configured to receive location information for a hose assembly tagged with the UAID. The one or more processors are configured to receive usage information for a hose assembly tagged with the UAID. The one or more processors are configured to generate a maintenance schedule for the hose based on the received usage information, the received hose specifications and the operational data. The network interface is connected to a cloud network. The system may include a transceiver configured to transmit the uaid to a test bench. Implementations of the described techniques may include hardware, a method or process, or computer software on a computer-accessible medium.

One general aspect includes a system for assembling hoses. The system also includes a crimper configured to receive crimp parameters; assemble a hose by crimping a fitting to the hose based on crimp parameters; generate monitoring data during the crimping and tag the hose with a unique assembly identification (UAID). The system also includes a crimp analyzer configured to generate the crimp parameters based on crimp operation data, update the crimp operation data with the generated monitoring data and generate the UAID.

Implementations may include one or more of the following features. The system may include a printer configured to tag the UAID to the assembled hose. The system may include a radio frequency identification (RFID) standard compliant tag attached to the hose that includes the UAID and the received crimp parameters. The RFID standard compliant tag uses near field communication (NFC). The system may include a test bench configured to test the hose assembly and generate additional operation data based on usage of the hose assembly and testing of the hose assembly. The crimp analyzer is configured to provide the crimp parameters and assembly date in response to the UAID. Implementations of the described techniques may include hardware, a method or process, or computer software on a computer-accessible medium.

One general aspect includes a method of performing a hose and fitting assembly. The method of performing also includes receiving hose specifications and fitting specifications for the hose and fitting assembly. The method of performing also includes generating crimp parameters by a crimper analyzer based on the received hose specifications and fitting specifications. The method of performing also includes obtaining crimp operation data. The method of performing also includes performing the hose and fitting assembly using the crimp operation data by a crimper. The method of performing also includes generating a unique assembly identification (UAID). The method of performing also includes writing the UAID to a radio frequency identification (RFID) standard compliant tag.

Implementations may include one or more of the following features. The method where the crimp parameters include a crimping force and the crimp operation data includes force applied during crimping and duration of crimping. Implementations of the described techniques may include hardware, a method or process, or computer software on a computer-accessible medium.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A crimper analyzer system comprising:
a network interface;
one or more processors coupled to the network interface and configured to:
generate crimp parameters based on received hose specifications and crimp operation data from the network interface;
update the crimp operation data with additional crimp operation data;
perform the hose assembly operation with a hydraulic hose and a fitting by a crimper using the updated crimp operation data to form a hose assembly;
generate a unique assembly identification (UAID) for the hose assembly operation subsequent to the hose assembly operation based on hose information and crimp process measurements;
perform a pressure test of the hose assembly at a multiple of an operating pressure for the hose to generate test results;
receive usage information for a hose assembly tagged with the identification; and
generate a maintenance schedule for the hose based on the received usage information.

2. The system of claim 1, wherein the hose specifications include hose material, inner diameter, and outer diameter.

3. The system of claim 1, wherein the fitting specifications include fitting material and fitting outer diameter.

4. The system of claim 1, wherein the crimp parameters include crimp diameter.

5. The system of claim 1, wherein the one or more processors are configured to provide the identification to the network interface for transmission to a crimper.

6. The system of claim 1, wherein the operational data includes crimp start time, crimp end time, and crimp pressure.

7. The system of claim 1, wherein the one or more processors are configured to receive location information for a hose assembly tagged with the identification.

8. The system of claim 1, further comprising a transceiver configured to receive the usage information.

9. The system of claim 1, further comprising a transceiver configured to transmit the identification to a test bench.

10. The system of claim 1, further comprising a radio frequency identification (RFID) standard compliant tag attached to the hose that includes the identification.

11. The system of claim 1, wherein the tag uses near field communication (NFC).

12. The system of claim 1, wherein the network is connected to a cloud network.

13. The system of claim 1, further comprising a memory to store the operation data and the received usage information.

14. The system of claim 1, the usage information includes geographic location.

15. The system of claim 1, the usage information includes environmental conditions.

16. The system of claim 1, further comprising a crimper to perform the hose assembly operation and a testbench to perform the pressure test.

* * * * *